(12) United States Patent
Kumar et al.

(10) Patent No.: US 10,270,280 B2
(45) Date of Patent: Apr. 23, 2019

(54) POWER RECEIVER HAVING MAGNETIC SIGNATURE AND METHOD FOR OPERATING SAME

(71) Applicant: Apple Inc., Cupertino, CA (US)

(72) Inventors: Arunim Kumar, Auckland (NZ); Nigel Gray, Auckland (NZ)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/035,804

(22) PCT Filed: Nov. 7, 2014

(86) PCT No.: PCT/NZ2014/000228
§ 371 (c)(1),
(2) Date: May 11, 2016

(87) PCT Pub. No.: WO2015/069121
PCT Pub. Date: May 14, 2015

(65) Prior Publication Data
US 2016/0301245 A1    Oct. 13, 2016

(30) Foreign Application Priority Data

Nov. 11, 2013 (NZ) ........................................ 617604
Aug. 12, 2014 (NZ) ........................................ 628597

(51) Int. Cl.
*H02J 50/12* (2016.01)
*H02J 7/02* (2016.01)
(Continued)

(52) U.S. Cl.
CPC .............. *H02J 7/041* (2013.01); *H02J 7/025* (2013.01); *H02J 17/00* (2013.01); *H02J 50/12* (2016.02);
(Continued)

(58) Field of Classification Search
None
See application file for complete search history.

(56) References Cited

U.S. PATENT DOCUMENTS

2010/0013322 A1    1/2010 Sogabe et al.
2010/0083012 A1    4/2010 Corbridge et al.
(Continued)

FOREIGN PATENT DOCUMENTS

CN    102272689 A    12/2011
CN    102725939 A    10/2012
(Continued)

OTHER PUBLICATIONS

International Search Report for International Application No. PCT/NZ2014/000228 dated Feb. 2, 2015 (5 pages).
(Continued)

*Primary Examiner* — Jared Fureman
*Assistant Examiner* — Joel Barnett
(74) *Attorney, Agent, or Firm* — Joseph F. Guihan

(57) ABSTRACT

There is provided a contactless power system, power receiver and method of operating such, in which the power receiver of the system is configured to receive power transmitted by a power transmitter of the system via contactless electromagnetic coupling of respective receiving and transmitting coils. The power receiver further has circuitry for reflecting a unique magnetic signal to the transmitting coil of the power transmitter upon receipt of a power pulse by the receiver coil of the power receiver.

13 Claims, 3 Drawing Sheets

(51) Int. Cl.
*H02J 7/04* (2006.01)
*H04B 5/00* (2006.01)
*H02J 50/60* (2016.01)
*H02J 17/00* (2006.01)
*H02J 50/80* (2016.01)
H02J 50/90 (2016.01)
H02J 7/00 (2006.01)
H02J 7/34 (2006.01)

(52) U.S. Cl.
CPC .............. *H02J 50/60* (2016.02); *H02J 50/80* (2016.02); *H04B 5/0037* (2013.01); *H02J 7/345* (2013.01); *H02J 50/90* (2016.02); *H02J 2007/0001* (2013.01)

(56) References Cited

U.S. PATENT DOCUMENTS

2011/0062793 A1 3/2011 Azancot et al.
2011/0181240 A1* 7/2011 Baarman ............... B60L 11/182
    320/108
2012/0098486 A1* 4/2012 Jung ....................... H02J 5/005
    320/108
2012/0311363 A1* 12/2012 Kim ..................... H04B 5/0037
    713/323
2012/0313448 A1* 12/2012 Anttila ................... H02J 5/005
    307/104

FOREIGN PATENT DOCUMENTS

| | | |
|---|---|---|
| JP | 2010259172 A | 11/2010 |
| JP | 2011229265 A | 11/2011 |
| JP | 2012244778 A | 12/2012 |
| WO | 2014070026 | 5/2014 |

OTHER PUBLICATIONS

European Search Report for EP Application No. 14860279.0 dated Jun. 14, 2017 (8 pages).

* cited by examiner

POWER RECEIVER HAVING MAGNETIC SIGNATURE AND METHOD FOR OPERATING SAME

This application is a National Stage Application of PCT/2014/000228, filed 7 Nov. 2014, which claims benefit of Serial No. 617604, filed 11 Nov. 2013 in New Zealand and Serial No. 628597, filed 12 Aug. 2014 in New Zealand and which applications are incorporated herein by reference. To the extent appropriate, a claim of priority is made to each of the above disclosed applications.

FIELD OF THE INVENTION

The present invention is in the technical field of contactless of inductively coupled cower transfer (ICPT) systems. More particularly, although not exclusively, the present invention relates to a power receiver having a preload circuit for providing a magnetic signature.

BACKGROUND OF THE INVENTION

Contactless power systems typically consist of a power transmitter that generates an alternating magnetic field and one or more power receivers coupled to the generated magnetic field to provide a local power supply. These contactless power receivers are within proximity, but electrically isolated from, the power transmitter. A contactless power receiver includes a power receiving coil in which current is induced by the magnetic field generated by the power transmitter, and supplies power to an electrical load.

Conventionally, power is transmitted directly to the receiver side load as soon as the transmitter and receiver sides are coupled. In the Applicant's U.S. Provisional Application No. 61/722,564 entitled "Inductively Coupled Power Transfer Method and Systems" filed Nov. 5, 2012 (now published as PCT Pamphlet No. 2014/070026 with an international filing date of Nov. 5, 2013), the entire contents of which are hereby incorporated by reference, description is made of a power transmitter which has a low power standby state: in which the transmitter is capable of detecting coupling of a power receiver; from which the transmitter wakes up or is "activated" only when such coupling is detected; and into which the transmitter enters when such coupling is ceased. Various detection circuitry and methods are described and generally involve the transmission of low energy pulses via the transmitter coil and detection of any change in electrical conditions within the transmitter side circuitry.

However, in many ICPT systems it would be further advantageous to ensure compatibility between the transmitter and receiver before power is delivered to the receiver side load.

SUMMARY OF THE INVENTION

According to an exemplary embodiment there is provided a contactless power system having a power transmitter having a transmitting coil and a power receiver having a receiving coil, the power receiver being configured to receive a power pulse transmitted by the power transmitter via contactless electromagnetic coupling of the respective coils, wherein the power receiver comprises preload circuitry for reflecting a unique magnetic signal to the transmitting coil upon receipt of the power pulse.

The preload circuitry of the power receiver may have a switchable load which sinks an amount of energy produced in the power receiver by the received power pulse for a predetermined amount of time, wherein the amount of energy providing the unique magnetic signal.

The switchable load may have one or more resistive elements having resistance values selected to sinks a selected amount of the energy produced in the power receiver by the received power pulse thereby producing a selected magnetic signal.

The preload circuitry of the power receiver may have a first capacitive element configured to charge upon receipt of the power pulse over a first time period and to cause switching of the switchable load at the end of the first time period.

The switchable load may be configured to be switched off at the end of the first time period thereby stopping the sinking of energy by the switchable load. The capacitance value of the first capacitive element being selected so that the first time period causes the switchable load to sink a selected amount of the energy produced in the power receiver by the received power pulse thereby producing a selected magnetic signal.

The preload circuitry of the power receiver may have a second capacitive element configured to charge upon receipt of the power pulse and to discharge upon cessation of the power pulse, the elapsed time between charging and discharging providing a second time period, the second capacitive element being connected to the first capacitive element to cause discharging of the first capacitive element at the end of the second time period.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION OF EMBODIMENTS OF THE INVENTION

Figure 1:
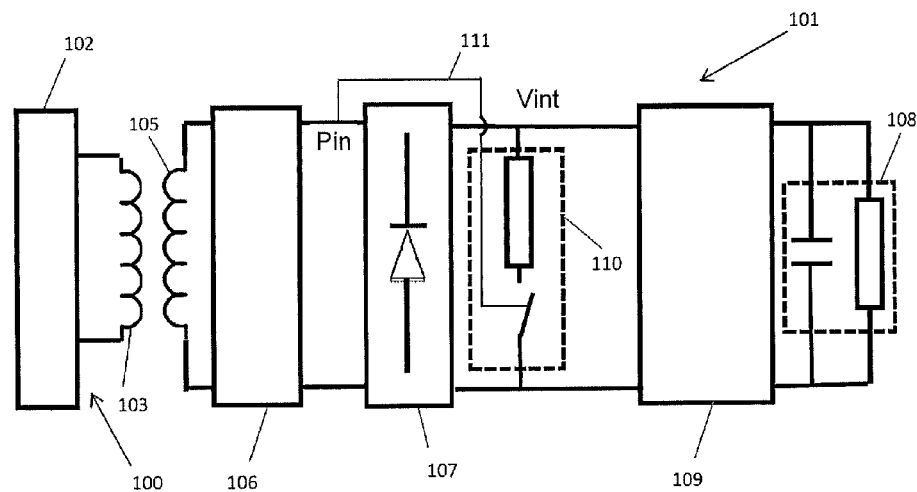
FIG. 1 illustrates a block diagram of an ICPT system having a power transmitter operatively coupled with a power receiver including a preload circuit.

An exemplary contactless or inductively coupled power transfer (ICPT) system shown in FIG. 1 includes a power transmitter 100 and a power receiver 101. The transmitter 100 includes a controller 102 which drives a power transmitting coil 103 to generate a magnetic field. The transmitting coil 103 can be driven to generate an alternating magnetic field. The receiver 101 includes a power receiving coil 105, a tuning circuit 106, a rectifier 107, a load 108 and a power flow control circuit 109. The receiving coil 105 and tuning circuit 106 represent a resonant circuit. The transmitter 100 includes a similar resonant circuit with or without a tuning component.

When the receiving coil 105 is in close proximity to the transmitting coil 103, the magnetic field of the power transmitter 100 induces an electric current in the receiving coil 105. As the magnetic field is alternating, the induced alternating electric current is rectified by the rectifier 107 to be converted into a direct current which therefore delivers DC power to the load 108. To achieve this the rectifier 107 may be a half-bridge or full-bridge rectifier, however other implementations are possible. Further, implementations where AC power is to be delivered to the receiver side load are applicable to the present invention. The load 108, which for example may represent a chargeable battery of a consumer device, is depicted as including a capacitive and resistive elements, however this is merely exemplary and more complex loads are possible.

The level of received power depends upon the frequency at which the resonant circuit of the receiver 101 is caused to resonate by the tuning circuit 106. Matching of the resonant frequencies of the transmitter and receiver resonant circuits allows maximum power transmission. Control of the power delivered to the receiver side load is provided in a number of ways. For example, control can be applied by tuning the operating frequency at the transmitter side, tuning the resonant frequency at the receiver side, or both. Further, power flow control to the load 108 is provided by the control circuit 109 which regulates the power delivered to the load 108 so that the load power requirements are met. For example, the control circuit 109 may be a power converter having a configuration such as Buck, boost, etc., depending on the requirements of the receiver load.

Conventionally, irrespective of the power flow control regime used, power is transmitted directly to the receiver side load as soon as the transmitter and receiver sides are coupled. The present invention ensures compatibility between the transmitter and receiver before power is delivered to the receiver side by extending the functionality of the detection regimes described in the afore-incorporated by reference U.S. Provisional Application No. 61/722,564 by including preload circuitry in the receiver side circuitry.

Referring again to FIG. 1, the ICPT system of the present invention is further provided with a preload circuit 110 between the rectification and power flow control stages provided by the rectifier 107 and the control circuit 109. The preload circuit 110 represents a switchable load which receives the rectified voltage $V_{int}$ output from the rectifier 107 under control of a switching circuit which is operated using the non-rectified received power Pin induced in the receiver side resonant circuit by the transmitter detection signal received via a line 111. The purpose of the preload circuit 110 is to sink the energy provided by the transmitter side detection signal for a predetermined amount of time so as to provide a unique receiver detect signal to the transmitter. This and other aspects of the preload circuit are now described with reference to FIGS. 2 and 3.

Figure 2:
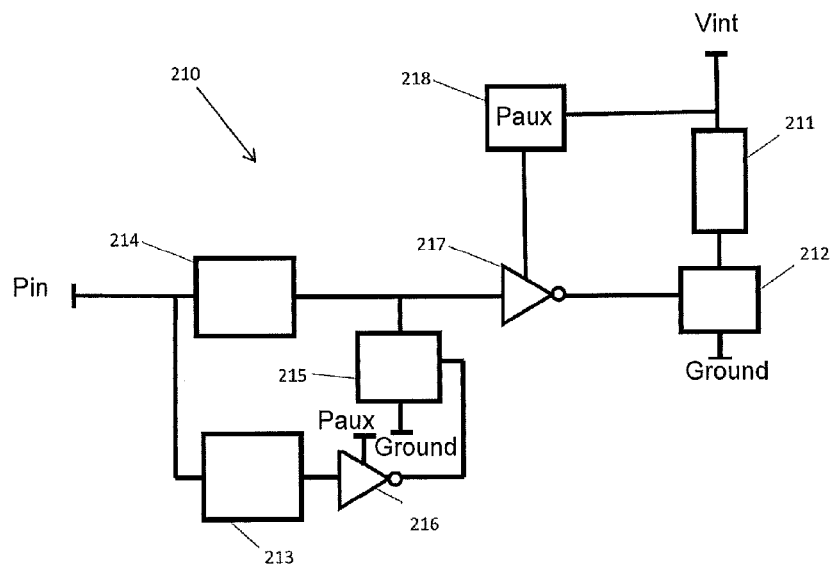
FIG. 2 illustrates a block diagram of the preload circuit of FIG. 1.
Figure 3:
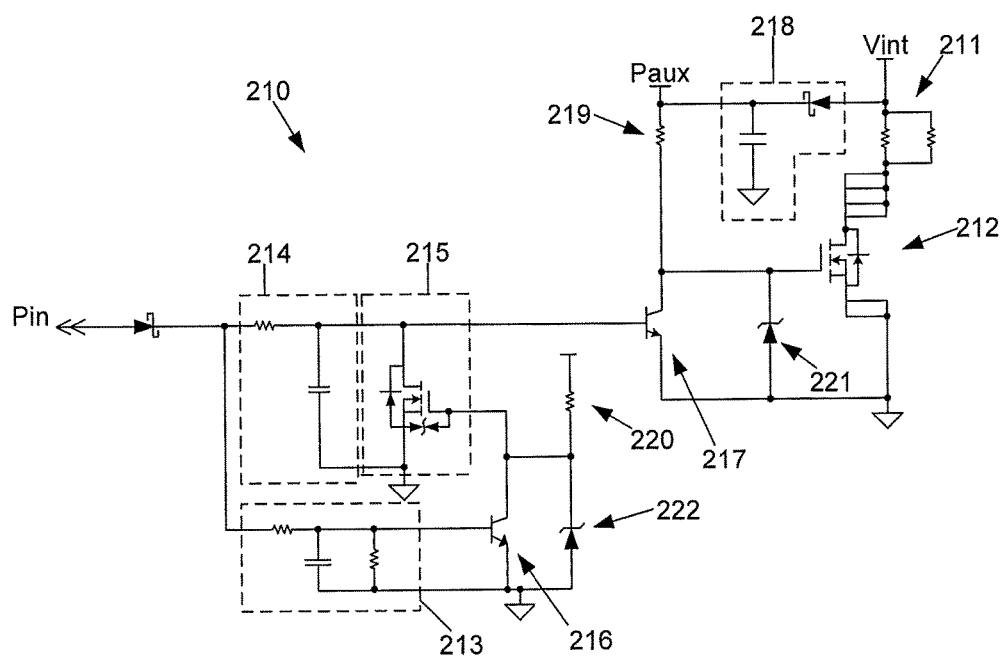
FIG. 3 illustrates a full circuit diagram for an exemplary implementation of the preload circuit of FIG. 2.

FIG. 2 illustrates an exemplary preload circuit 210 as a block diagram and FIG. 3 illustrates the preload circuit 210 as an exemplary full circuit diagram. Like elements of the preload circuits illustrated in FIGS. 2 and 3 are labelled with like reference numerals. The configuration and exemplary operation of the preload circuit of the present invention is now described.

The preload circuit 210 has a preload 211 which receives the rectified voltage $V_{int}$, a preload switch 212 for connecting/disconnecting the preload 211 to the power receiver circuitry, a preload set/reset circuit 213 and a preload disconnect circuit 214 which each receive the received power Pin for operation and together provide timing control of the operation of the preload switch 212, and a preload reset switch 215 which operates to reset the preload circuit 210. A gate switch 216 between the set/reset circuit 213 and the reset switch 215, and a gate switch 217 between the disconnect circuit 214 and the preload switch 212 are also provided which operate under control of the auxiliary power $P_{aux}$ from a preload power supply 218.

In use, the received AC power Pin from the transmitter detection signal is input to activate the preload circuit 210 whilst the rectified voltage $V_{int}$, termed herein "intermediate voltage" as it is intermediate of the rectification and regulation stages of the power receiver 101, is input to activate the preload power supply 218 which turns the preload and reset switches 212 and 215 on. This allows the preload 211 to act as an energy "dump" or power "sink" by dissipating the energy provided by the intermediate voltage $V_{int}$. This energy dump causes a sudden current inrush which is reflected back to the power transmitter 100. As described in the afore-incorporated by reference U.S. Provisional Application No. 61/722,564, such a reflected inrush signal is used by the power transmitter to detect coupling to the power receiver. However, unlike previous power receiver configurations, the addition of the preload circuit in the power receiver of the present invention allows not only detection of the power receiver coupling but also identification of particular power receiver types. This identification will now be explained.

The preload 211 is configured as an impedance to the intermediate voltage $V_{int}$, for example, in FIG. 3 the preload 211 is depicted as including resistive elements. Accordingly, by configuring the preload 211 with resistors, capacitors and/or inductors of different values and/or in different combinations the amount of energy "dumped" by the preload 211 can be changed, thereby changing the characteristics of the associated reflected inrush signal. As such, providing the power receiver with a uniquely configured preload circuit provides a unique magnetic signal or signature of the power receiver which can be used by the power transmitter to identify and distinguish certain power receivers. This has many advantages.

For example, rather than just relying on the coupling of a receiver that can inherently receive power transmitted by the transmitter as the condition for initiating power transfer, the ICPT system of the present invention allows validation of the receiver by the transmitter before power transfer. This initial validation (or hand shake) is advantageous, for a number of reasons which non-exhaustively include either separately or in various combinations:

1) Increased safety: the transmitter coil is not powered on when electrically conductive objects, such as metallic objects, are in proximity to the transmitter coil thereby preventing undesirable heating of the objects, thereby providing enhanced so-called foreign object detection (FOD);
2) Increased robustness: malfunction of the receiver and/ or transmitter is prevented due to an incompatible receiver being powered by the transmitter;
3) Increased efficiency: the operating frequency of the transmitter can be dynamically fine-tuned to the resonant frequency of the validated compatible receiver so maximum power is delivered;
4) Reduced power consumption: the transmitter can be maintained in low power standby or a sleep mode until a compatible receiver is detected, since incompatible receivers or foreign objects do not trigger power up of the transmitter;

5) Increased compatibility: the ability to uniquely identify various compatible receivers means that the appropriate amount of power can be delivered such that a single transmitter can be used to power many different types of receivers, for example, a transmitter configured to deliver a range of power levels can be used to charge a smartphone requiring 7.5 W as well as a tablet requiring 15 W without compromising the effectiveness of delivery; and 6) Data collection: important information like misalignment between the transmitter and receiver coils, etc., can also be gathered.

The preload circuit 210 of the present invention is further configured to support a wide range of transmitter-receiver detection regimes. That is, the power transmitter may be configured to transmit multiple energy pulses in rapid succession in order to detect the power receiver. For example, the transmitter may send an energy pulse 200 microseconds in length and then wait for a period of 50 microseconds before sensing the next energy pulse which may or may not be of the same type (duration and frequency) as the first pulse. Accordingly, the preload circuit 210 is configured so that once an energy pulse is received, the unique magnetic signature is communicated quickly and the circuit is rapidly reset to dissipate any energy left in the circuit prior to receipt of subsequent energy pulses. This is achieved by operation of the preload and reset switches 212 and 215 which are initially turned on upon receipt of the transmitter energy pulse and subsequently turned off after predetermined amounts of time set by operation of the set/reset and disconnect circuits 213 and 214. The predetermined amounts of time are set so that disconnect and resetting of the preload circuit 210 occur within the timing between the short-duration energy pulses transmitted by the power transmitter for receiver detection. The disconnection of the preload circuit enables either a subsequent energy pulse to be dumped by the preload circuit or normal power flow to the load 108 via the control circuit 109 upon normal power transmission from the transmitter. The timing of the preload circuit set and reset is achieved as described later.

Referring again to FIG. 3, a full circuit example of the preload circuit 210 is now described. Each of the set/reset and disconnect circuits 213 and 214 include capacitive and resistive elements configured as power converters so that the input AC power Pin is converted into respective DC signals depending on the respective capacitance and resistance values. The gate switches 216 and 217 are configured as semiconductor switches, namely bipolar junction transistors of an npn type with the bases receiving the respective DC signal, the emitters connected to ground and the collectors connected to the preload reset switch 215 in the case of the gate switch 216 and the preload switch 212 in the case of the gate switch 217. In this way the DC signals from the set/reset and disconnect circuits 213 and 214 operate the gate switches 216 and 217.

The preload and preload reset switches 212 and 215 are also configured as semiconductor switches but as metal oxide semiconductor field effect transistors of an n type (nMOSFET), with the gates receiving the auxiliary power $P_{aux}$ from the preload power supply 218 via a respective pull up resistive element 219 and 220, the sources connected to Ground (see also FIG. 2), and the drains connected to the preload 211 in the case of the preload switch 212 and the base of the gate switch 217 in the case of the preload reset switch 215. The preload power supply 218 includes a capacitive element which charges up upon receipt of the intermediate voltage $V_{int}$ thereby supplying the auxiliary power $P_{aux}$ to the gates of the preload and reset switches 212 and 215 causing the switches 212 and 215 to be on by default. Each of the gates of the preload and reset switches 212 and 215 are also connected to a respective gate voltage protection (Zener) diode 221 and 222 to ensure the gate-source voltages do no exceed the maximum rating allowed for the nMOSFETs.

In order to stop the energy dumping by the preload 211 the preload switch 212 is turned off after a first time period by the disconnect circuit 214. The preload circuit 210 is then reset. Resetting is achieved by the preload reset switch 215 being first turned off when the signal from the power transmitter 100 is received by the set/reset circuit 213 and then being turned on once the signal from the power transmitter 100 stops. This provides a second time period.

In particular, receipt of the AC power Pin causes the capacitive element of the set/reset circuit 213 to charge up thereby turning the gate switch 216 on. This pulls the transistor gate of the preload reset switch 215 low from its afore-described default high state thereby turning the preload reset switch 215 off. This sets the beginning of the first and second time periods. Once the reset switch 215 is turned off, the capacitive element of the disconnect circuit 214 charges up thereby turning the gate switch 217 on. This pulls the transistor gate of the preload switch 212 low from its afore-described default high state thereby turning the preload switch 212 off. This sets the end of the first time period. The first time period causes a delay from receipt of the AC power Pin before the gate switch 217 is activated so that the preload switch 212 remains on for a short time thereby allowing the preload 211 to dump the energy from the transmitter energy pulse to create the unique magnetic signature.

The relative configurations of the set/reset and disconnect circuits 213 and 214 are selected by suitable selection of the resistance/capacitance values of the resistive/capacitive elements, so that the preload reset switch 215 is turned off quickly and the voltage in the disconnect circuit 214 is allowed to rise. Selection of the first time period provided by the disconnect circuit 214, e.g., by choosing resistive and/or capacitive elements with larger or smaller resistance/capacitance values, provides another mechanism of changing the magnetic signature so as to create different and unique magnetic signatures.

When the AC power Pin is removed, i.e., the transmitter energy pulse ceases, the capacitive element of the set/reset circuit 213 discharges thereby turning gate switch 216 off and allowing the gate of the preload reset switch 215 to go high again under influence of the auxiliary power $P_{aux}$ and the pull up resistive element 220. Consequently, the reset switch 215 is turned back on, thereby setting the end of the second time period. This shorts the voltage across the disconnect circuit 214 thereby discharging the capacitive element of disconnect circuit 214 and resetting the preload circuit 210. Configuring the set/reset circuit 213 to set the smallest possible time for operation of the gate switch 216, e.g., by suitable selection of the resistance/capacitance values of the resistive/capacitive elements, allows the disconnect circuit 214 to be discharged as quickly as possible. Accordingly, the preload circuit 210 is rapidly reset to be ready in time for any subsequent energy pulse from the transmitter.

One of ordinary skill in the art understands that the circuitry elements and their respective values included in FIG. 3 are merely exemplary, and other configurations and/or values can be selected whilst still providing the operation and advantages of the ICPT system of the present invention. Similarly, any values described in the present specification are also merely exemplary. Further, the preload circuitry of the present invention has been described as being located at an "intermediate" (or "rectified") stage of the ICPT power receiver between rectification and power flow control stages. One of ordinary skill in the art understands that other and/or different locations for the preload circuitry within the power receiver can be used whilst still providing the operation and advantages of the ICPT system of the present invention. Further still, one of ordinary skill in the art understands that locating the preload circuitry within the power transmitter instead, or in addition to, the power receiver is possible if the power receiver is configured to transmit communication signals to the power transmitter for the purpose of validating the transmitter whilst still providing the operation and advantages of the ICPT system of the present invention.

Exemplary operation of the preload circuit is now described with reference to FIG. 4 in relation to the circuit example of FIG. 3. In this example, when the receiver 101 receives AC power from the transmitter 100, as shown in view (a) of FIG. 4, during an initial 'ping' power signal transmitted by the transmitter 100 to the receiver 101, the intermediate voltage $V_{int}$ rapidly rises (region A in view (c) of FIG. 4) until there is sufficient voltage at the gate of the preload switch 212 (point B in view (b) of FIG. 4). At this point the preload switch 212 is turned 'on' causing substantially instantaneous collapse of the intermediate voltage (point C in view (c) of FIG. 4) because the preload 211 (which is selected to be a relatively very small value, e.g., about 5 Ohms to 10 Ohms) is shorted to Ground. The gate of the preload switch 212 remains 'high' for a certain period, e.g., about 200 microseconds to 500 microseconds (period $t_{on}$ in view (c) of FIG. 4) and then is switched 'low' by the disconnect circuit 214 (point D in view (b) of FIG. 4). This causes the intermediate voltage $V_{int}$ to return to the typical level of normal operation of the receiver 100 (point E in view (c) of FIG. 4). This is the point at which the preload circuit 210 enters steady-state operation during which the gate voltage of the preload switch 212 remains 'low' and the preload switch 212 remains off (period F in views (b) and (c) of FIG. 4).

Figure 4A:
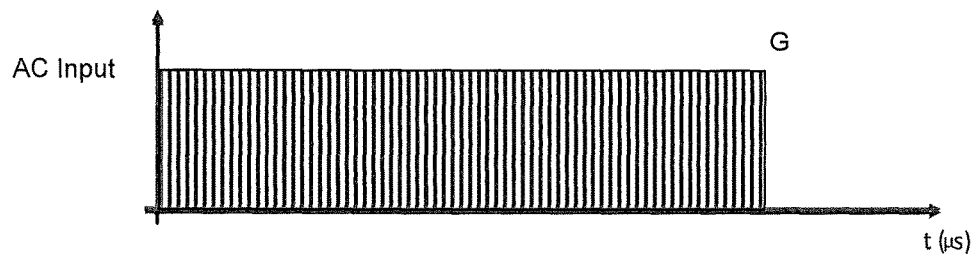
FIG. 4 illustrates view (a): an exemplary AC input received by the power receiver from the power transmitter for operation of the preload circuit, view (b): the voltage/current conditions of the preload circuit, and view (c): the corresponding voltage conditions of the intermediate voltage of the power receiver during operation of the preload circuit.
Figure 4B:
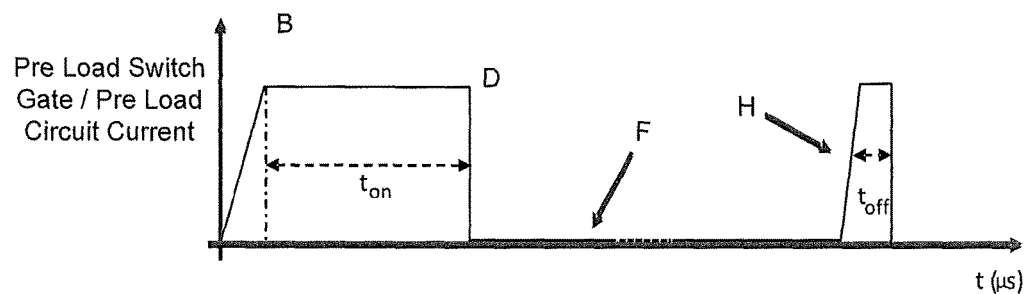
Figure 4C:
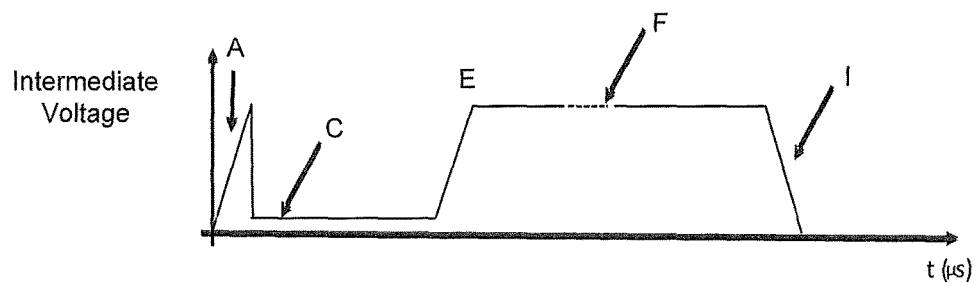

When the power transmitter 100 ceases to transmit power, the AC input to the power receiver 101 (and into the preload circuit 210) ceases (point G in view (a) of FIG. 4). This causes the gate voltage of the preload switch 212 to be pulled 'high' (region H in view (b) of FIG. 4). The preload switch 212 is thus turned on and the intermediate voltage is shorted to Ground through the preload 211 (region I in view (c) of FIG. 4. All the energy stored in the power receiver 101 is dissipated and the entire preload circuit 210 is rapidly reset, e.g., within about 50 microseconds, via operation of the preload reset switch 215 (after period $t_{off}$ in view (b) of FIG. 4). The preload circuit 210 is now ready to respond to the next AC pulse from the power transmitter.

While the present invention has been illustrated by the description of the embodiments thereof, and while the embodiments have been described in detail, it is not intended to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the general inventive concept.

The invention claimed is:

1. A power transmitter having a transmitting coil and configured to:
   transmit a power pulse to a power receiver via contactless electromagnetic coupling with a receiving coil of the power receiver;
   receive a reflected magnetic signal from the power receiver via contactless electromagnetic coupling with the receiving coil of the power receiver, the reflected magnetic signal having a duration;
   determine the duration of the reflected magnetic signal; and
   determine an identity of the power receiver based on the duration of the reflected magnetic signal.

2. The power transmitter of claim 1, wherein the duration of the reflected magnetic signal is 200-500 microseconds.

3. The power transmitter of claim 1, wherein the transmitter is configured to send multiple power pulses having different duration and/or frequencies.

4. The power transmitter of claim 1, further configured to detect coupling to the power receiver based on the reflected magnetic signal.

5. The power transmitter of claim 1, wherein the determination of an identity of the power receiver is further based on an amount of energy dumped by the power receiver.

6. The power transmitter of claim 1, further configured to validate the power receiver for power transmission based on the identification.

7. A power receiver having a receiving coil and configured to receive a power pulse transmitted by a power transmitter via contactless electromagnetic coupling with a transmitting coil of the power transmitter, wherein the power receiver comprises:
   preload circuitry for reflecting a magnetic signal to the transmitting coil upon receipt of the power pulse,
   wherein the preload circuitry of the power receiver comprises one or more resistors, one or more capacitors and a switchable load,
   wherein the switchable load is configured to switchably sink an amount of energy produced in the power receiver with the received power pulse for an amount of time in order to provide the magnetic signal, and
   wherein the amount of time is based on the resistance of the one or more resistors and the capacitance of the one or more capacitors.

8. The power receiver of claim 7, wherein the one or more capacitors of the preload circuitry charges upon receipt of the power pulse over the amount of time and causes switching of the switchable load at the end of the amount of time.

9. The power receiver of claim 8, wherein causing switching of the switchable load at the end of the amount of time comprises disconnecting the switchable load thereby stopping the sinking of energy by the switchable load.

10. The power receiver of claim 8, wherein the preload circuitry of the power receiver comprises a second capacitor configured to charge upon receipt of the power pulse and to discharge upon cessation of the power pulse, the elapsed time between charging and discharging providing a second amount of time, the second capacitor being connected to the first capacitor to cause discharging of the first capacitor at the end of the second amount of time.

11. The power receiver of claim 7, wherein the one or more resistors and the one or more capacitors are configured to set one or both of the following:

the beginning of the amount of time following receipt of the power pulse;

the end of the amount of time following receipt of the power pulse.

12. The power receiver of claim 7, wherein the amount of time is 200-500 microseconds.

13. The power receiver of claim 7, wherein the switchable load comprises one or more inductive elements having selected inductance values.

* * * * *